H. W. O'DOWD.
HEATING APPARATUS.
APPLICATION FILED FEB. 12, 1916.

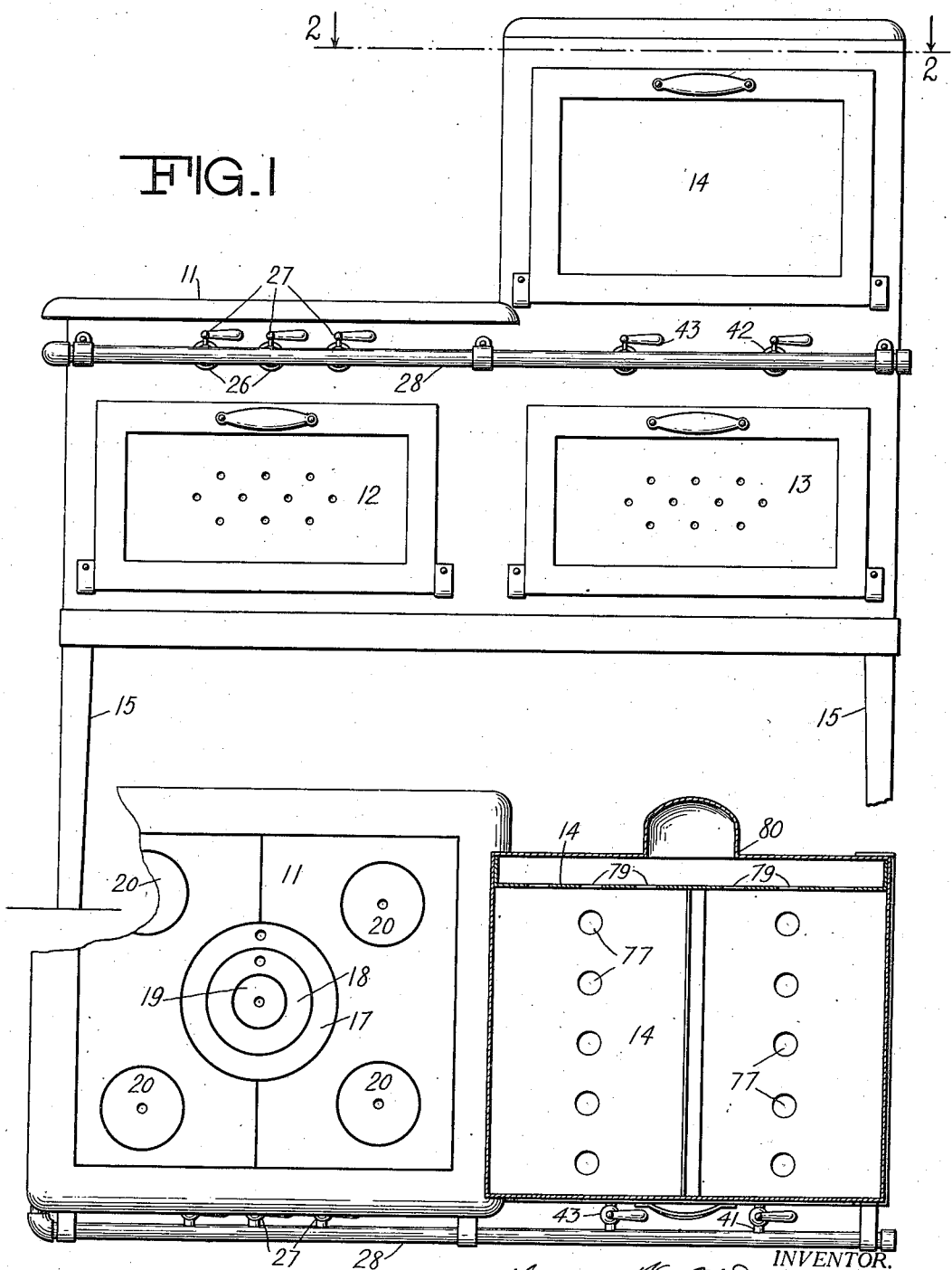

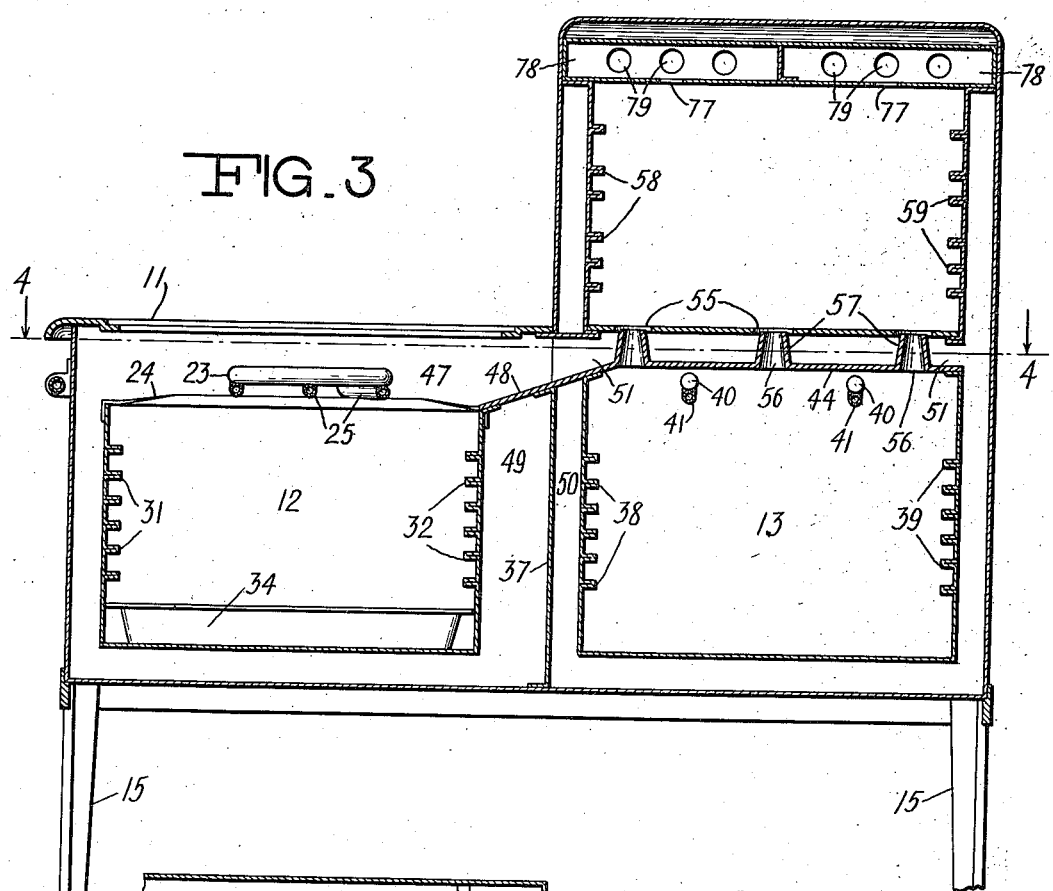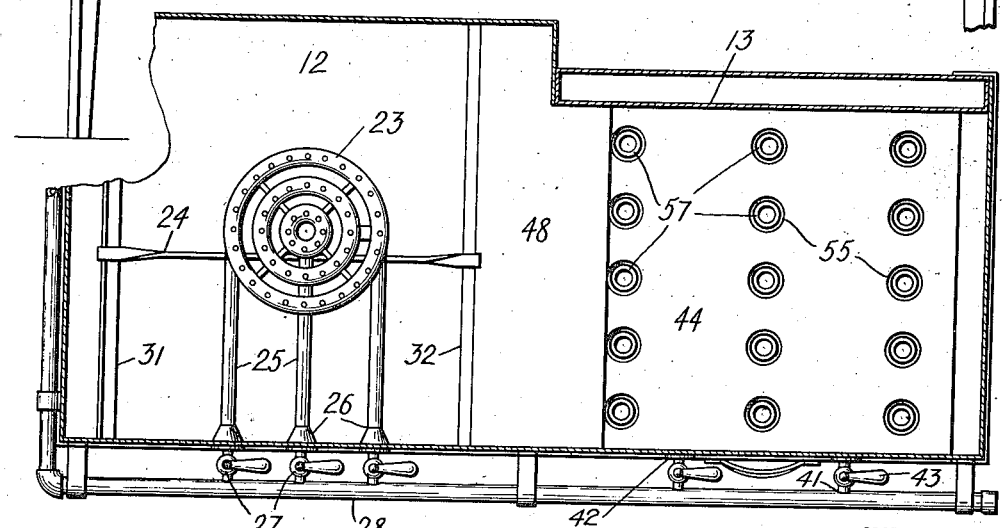

1,296,209.

Patented Mar. 4, 1919.
4 SHEETS—SHEET 3.

INVENTOR.
Henry W. O'Dowd
BY
Wm. J. Dolan, ATTORNEY

UNITED STATES PATENT OFFICE.

HENRY W. O'DOWD, OF JERSEY CITY, NEW JERSEY, ASSIGNOR TO WILLIAM M. CRANE COMPANY, A CORPORATION OF NEW YORK.

HEATING APPARATUS.

1,296,209.

Specification of Letters Patent.

Patented Mar. 4, 1919.

Application filed February 12, 1916. Serial No. 77,861.

*To all whom it may concern:*

Be it known that I, HENRY W. O'DOWD, a citizen of the United States, and a resident of Jersey City, county of Hudson, and State of New Jersey, have made certain new and useful Improvements in Heating Apparatus, of which the following is a specification.

The invention disclosed herein has reference to a stove of general adaptation, that is, capable of use for the practice of the culinary art in its multiple branches, such as frying, boiling or stewing, broiling, roasting and baking.

The principal object of the invention is to produce a stove embodying a novel disposition of parts whereby one will be enabled to perform conjointly and with the strictest economy a number of cooking operations that are usually carried on independently of one another at much greater expense, wherever the heat consumed is derived from fuel which can be drawn upon or cut off at will, such as gas, and the like.

Other objects and advantages of the invention will in part be obvious and in part be brought out while setting forth the several stove forms and peculiar features thereof, hereinafter particularized.

Among the various features serving to distinguish this improved stove from the prior art may be noted first that it includes a cooking surface available in its entirety for the accommodation of external utensils, combined with an elevated oven located to one side thereof, and heat transmitting instrumentalities adapted to convey the excess of caloric from the said surface to the said oven.

A similar feature, allied to the foregoing, resides in that the construction admits of the heat being transferred or shifted from the cooking surface to a broiling compartment thereunder, while the overplus again is conveyed to the lateral oven above.

Another feature, likewise characteristic of the invention, is that it comprises dual broiler sections, or covered compartments with internal sources of heat, which are so connected to the upper oven aforesaid that the surplus heat will ascend readily into the latter from either source, and the heat from both sources may also be used in the oven cumulatively.

Four distinct methods of heating the said upper oven are involved in its operation conjointly with the said broiler sections,—the same consisting, respectively, in the direct heat transmission into the interior of the oven; internal heating modified by deflection of directly-transmitted currents; conveyance of heat to the oven both interiorly and exteriorly; and heating by radiation, through application of the caloric to the exterior exclusively.

Several minor features, also differentiating the present invention from previously known heating and cooking apparatus, will be unfolded in turn as the specification proceeds.

Referring to the drawings hereto annexed, for a detailed description of the structural elements and combinations of parts incorporated in the invention:

Figure 1 is a front elevation, illustrating one form of the invention as applied to a gas stove or range;

Fig. 2 is a partly-broken plan view of the same, with one-half thereof in section, the latter being on the line 2—2 of Fig. 1, looking downward;

Fig. 3 is a vertical section, showing the interior of the stove, as viewed from the front;

Fig. 4 is a partly-broken sectional plan taken along the line 4—4 in Fig. 3, again looking in a downward direction;

Figure 5:
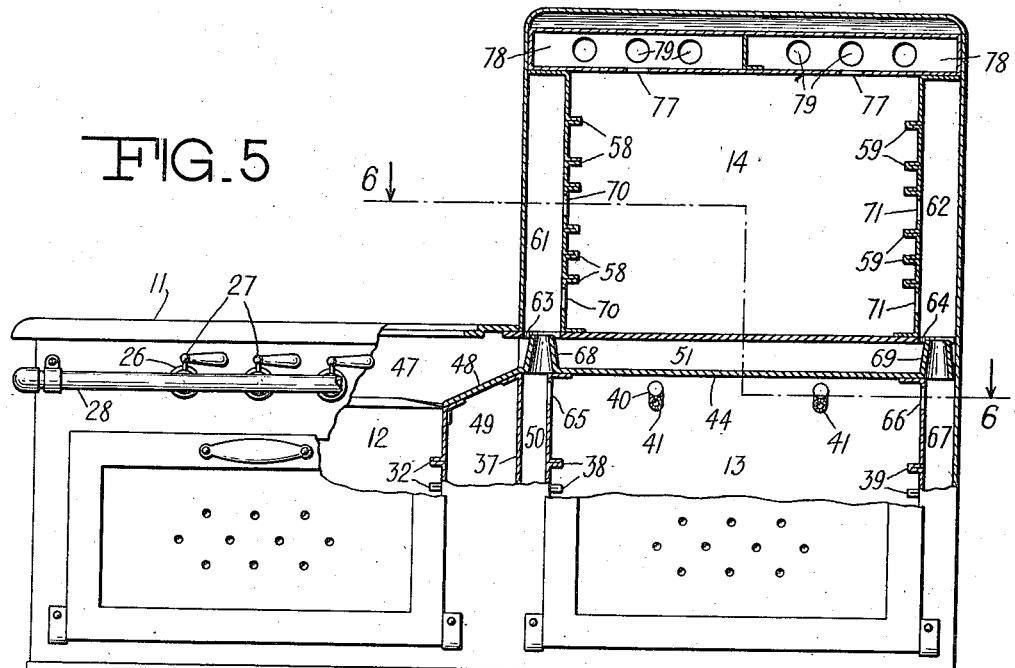
Fig. 5 is a front elevation, partly in section, representing a modified embodiment of the invention.

This improved stove comprises a cooking top, designated by the reference numeral 11, and three ovens or oven-like compartments, respectively numbered 12, 13 and 14. By preference, the oven 12 is placed alone under the top 11, while the ovens 13 and 14 are located by the side thereof, in superposed relation, spaced internally one above the other. For sanitary and practical reasons, the entire stove structure, including the said top and triple oven equipment, is elevated from the floor or ground line substantially as shown, being mounted, for instance, on legs 15, at a convenient height for the several cooking operations.

The cooking top 11 is made to extend directly over a source of heat, presently to be described, and consists preferably of cast-iron plates, with reducing rings 17, 18, and lids 19, 20, which together form a close surface, admitting of practically no escape of heat, such as usually occurs where spider work or fret work is used to cover up a stove. This surface, it will be seen, is fully exposed throughout its length (or depth) and width, and therefore affords a free space where open or external cooking can be performed without hindrance or obstruction.

In the upper part of the oven 12 is placed a set of gas-burners 23, of concentric annular type, which as shown may be made to rest upon a transverse support 24, bearing upon the walls of the oven on opposite sides. The burners 23 have the usual complement of feed-pipes 25, air-mixers 26, and rotary valves 27, and receive the fuel gas from a supply-pipe 28, attached to the stove a little below the cooking surface. They constitute the source of heat above referred to, and are primarily available for the two-fold purpose of heating the cooking top and the oven thereunder. When quick meals are desired, such as are usually served on short orders and may be cooked over the stove's surface, the central lid and adjacent ring or rings can be removed from the latter, when direct contact will be obtained with the flames from the burners, or some one among them. Rapid cooking of various sorts can be effected in this way. A semi-contact with the flames can be had by removing the outer lids. Meanwhile the remainder of the stove's surface, to wit, the covered spaces between the lids and rings, or their openings, may be utilized for slow cooking or simmering.

For surface or external cooking, as just spoken of, the gas-burners are ordinarily positioned with their jets uppermost, as indicated in Fig. 4. These burners may also be employed for broiling, in the same position, since the cast-iron plates of the top thereabove deflect a great amount of heat that can be used for that purpose in the oven 12 below, the latter remaining permanently uncovered under the burners, that is, having no other cover but the aforesaid cooking top 11 of the stove. However, these burners may be inverted to carry on the broiling in the customary manner, with downwardly directed gas jets, as will be understood.

To facilitate the broiling operation, the oven 12 is provided on opposite sides with ledges or racks, as 31, 32, disposed in pairs, respectively adapted to support grids (not shown) at varying distances from the burners, according to the intensity of fire or flame to which it may be desired to subject the meat or fish to be broiled. A drip-pan, as 34, may be placed under the gridirons, as suggested in the lower part of Fig. 3 on the left-hand side, or a similar pan may be substituted for the regular form of broiling appliance, as preferred. If not used as a broiler section, the oven 12 may be utilized for keeping food and dishes warm, or for other purposes, as the cooking top 11 thereover in reality makes it a closed compartment, that can be taken advantage of, with proper heat regulation, for the performance of divers culinary functions.

As represented in the drawings, the oven 13 is located immediately to the right of the oven 12, and with it, forms the lower portion of the stove, wherein these two ovens are divided merely by a central partition 37. Like 12, the oven 13 is intended for use principally as a broiler section, and consequently it includes opposite pairs of gridiron rests or ledges 38, 39, and an upper set of gas-burners 40, fed from the aforementioned supply-pipe 28, by branch-pipes 41, having air-mixers 42, and rotary valves 43. It is further provided with a top or cover 44, which may or may not be apertured, as hereinafter specified. Thus, the two lower ovens, 12 and 13, resemble each other in several respects, and therefore may be considered and will be treated herein as dual broiler sections, or dual compartments containing sources of heat that can be either wholly or partly covered.

The space that contains the burners 23 in the upper part of the oven 12 may properly be said to constitute a heat-generating chamber, herein designated by the numeral 47. This chamber is extended intermediately of the superposed ovens 13 and 14, by placing a plate 48, in a somewhat inclined plane, across the upper edge of the partition 37 before mentioned, so as to bridge over gaps 49, 50, intervening between the opposite sides of the said partition and the inner walls of the two broiler sections, respectively. The plate 48 leads to a space 51 within the body of the stove, which space is above the top 44 of the oven 13 and below the bottom of the oven 14, and forms the chamber extension. It will be noted that the chamber 47, including its lateral extension here described, is related to the three ovens, in the sense that it occupies a position enabling it to supply heat currents to all of them, either directly or by radiation.

Heat generated by the burners 23 can be transmitted in a substantially direct course into the interior of the oven 14, through the said chamber 47 and extension 51, and to that end, the bottom of this oven, in the form of the stove represented by Figs. 3 and 4, is provided with apertures or perforations, as at 55. In a similar manner, the oven 14 can be heated interiorly also from the burners 40 in the oven 13, the upper portion of which may be likened to a second heat-generating chamber. For the latter purpose, the top 44 of the oven 13 is apertured, as at 56, and equipped with tubing 57, to establish a direct communication between the two superposed ovens. The tubes 57 traverse the chamber extension 51, and lead up from the apertures 56 in the top 44 to and within the perforations 55 in the bottom of the oven 14. As will be noted, the upper ends of the several tubes 57 are narrowed in, so they may not fill the perforations 55, but will leave openings around them sufficiently large to permit the passage therethrough of heat currents emanating from the burners 23. At the same time, ports of limited area are thereby formed, which check the free flow of the currents, it being understood that only the overplus of the heat generated in the chamber 47 is intended for transmission to the oven 14, to wit, whatever is not to be absorbed by the cooking surface above the burners 23, or spent upon the broiler below. The construction shown, it will be observed, makes it possible to heat the oven 14 from either set of burners, 23 or 40, or by both sets combined. The last-named oven is adapted for use as the baking or roasting section of the stove, and fitted with side rests, as 58, 59, for the support of pan-grates or shelves (not shown).

Figure 6:
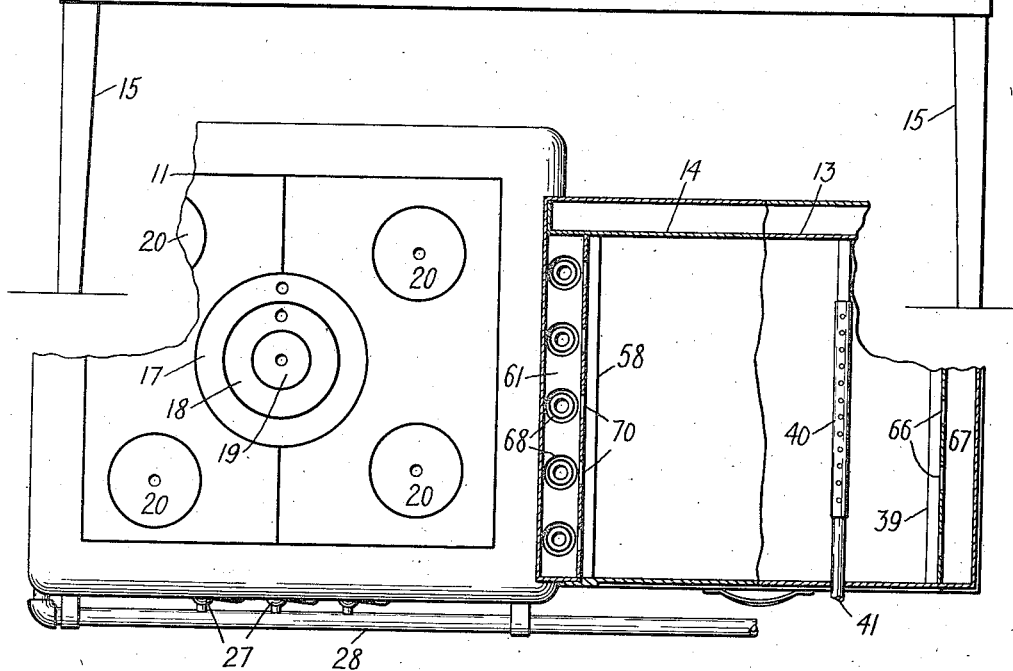
Fig. 6 is a plan, partly broken and partly sectioned, of the latter embodiment, the section running along the irregular line 6—6 in Fig. 5.

The said baking or roasting section of the stove can be heated both interiorly and exteriorly from the burners 23 and 40, by following the construction exemplified in Figs. 5 and 6. The structure there shown allows some of the heat generated in the chamber 47 to pass upwardly from the extremities of the extension 51 thereof, into flue spaces 61, 62, on the opposite sides of the oven 14, through apertures or perforations 63, 64. On the other hand, part of the heat generated in the broiler section 13 is permitted to flow out laterally therefrom through openings 65, 66, leading respectively into the before-mentioned gap 50 on the left of the section, and a similar gap 67 on the right. From these gaps the heat is caused to ascend into the flue spaces 61, 62, through tubes 68, 69, projecting into the said perforations 63, 64. The upper ends of the latter-named tubes are narrower than these perforations,— standing in a similar relation thereto as the tubing 57 to the perforations 55, both previously described, for a like purpose. The heat rising into the spaces 61, 62 partly surrounds the oven 14, and partly enters the same through openings 70, 71, in its opposite inner walls. The baking or roasting in this form of the stove, it will be perceived, can be effected with heat derived from either of the sources appertaining to the dual broiler sections, or from the combined sources, as well as in the former case. The interior fitting of the oven 14 is the same in either form of the invention.

Figure 7:
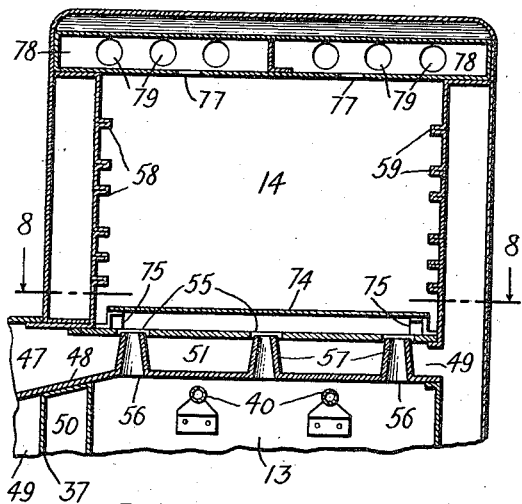
Fig. 7 is a fragmentary view showing an accessory element in the upper oven pertaining to the construction illustrated in Fig. 3.
Figure 8:
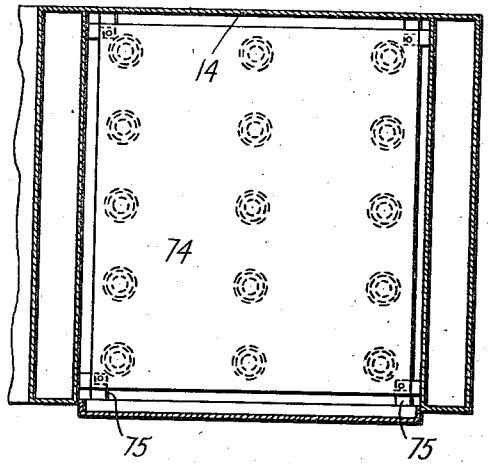
Fig. 8 is a section on the line 8—8 of Fig. 7, giving a top plan view of the said element.

It will be noticed that the bottom of the oven 14 in Fig. 3 could serve as a cooking surface above the broiler section 13, owing to the proximity of the burners 40, if it were so desired. The arrangement shown is productive of an intense heat, which oftentimes is quite desirable for quick baking or roasting. But, if the heat is too severe for the baking or roasting to be accomplished in the requisite manner, one may use a baffle or spreading plate 74, as indicated in Figs. 7 and 8, to retard the flow of heat as it enters the oven, through the perforations 55 in the bottom of the latter. The plate 74 can be made to rest upon corner supports, as 75, at a short distance above the apertured oven bottom, and will there receive the harsh impact of the heat, which it will thus operate to deflect and diffuse throughout the oven in a milder condition. Excepting these additional elements, namely, the said plate 74 and its supports 75, the construction illustrated in Figs. 7 and 8 is identical with that shown in Figs. 3 and 4, and is marked with corresponding reference numerals.

In the embodiments of the invention represented by Figs. 1 to 8, inclusive, the heat that accumulates in the oven 14 is vented through openings 77 in the top thereof, over which it spreads temporarily within horizontal flues 78, overlying the same. Thence, the heat is allowed to escape into the atmosphere through apertures 79, leading to an outlet, as 80, in the rear of the stove; or it may pass out through pipes carried into a chimney (not shown).

Figure 9:
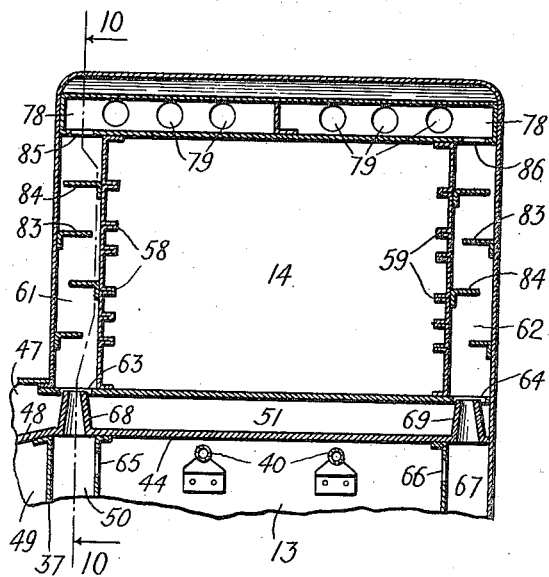
Fig. 9 is a sectional elevation of a modified form of the upper oven shown in Fig, 5.
Figure 10:
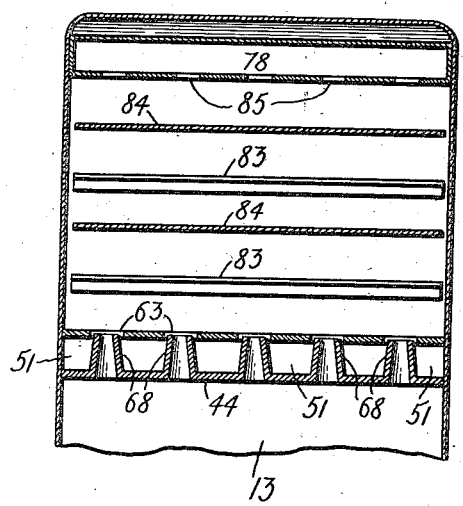
Fig. 10 is a sectional view of this modified form, taken transversely through the oven in the plane indicated by the line 10—10 in the preceding figure, looking toward the left.

If it be desired to heat the oven 14 through radiation alone, that is, by directing the currents of heat against the exterior of the oven exclusively, this can be effected by adopting the construction disclosed in Figs. 9 and 10. The arrangement for leading the heat either from the chamber 47 and its extension 51, or from the broiler section 13, upwardly by the sides of the oven 14, is the same in the last-named views as was previously described with reference to Figs. 5 and 6. This includes the flue spaces 61, 62; the openings 63, 64, leading thereinto from the extremities of the chamber extension 51; the lateral openings 65, 66, to the oven 13; the gaps 50, 67, on opposite sides of the said oven 13; and the tubes 68, 69, projecting into the openings 63, 64. But, there is no aperture in either the sides, or the bottom, or the top of the inner oven 14 in the form of stove exemplified in Figs. 9 and 10. The heat allowed to enter the flue spaces 61, 62, is intended for impingement against the exterior only of this oven, and in order that its contact therewith may be prolonged to the greatest extent, the opposite walls of these spaces are provided with deflecting plates 83, 84, which progressively increase in width in an upward direction, so that the outflow of heat will be checked as much as possible. Exits 85, 86 for the said currents, are formed at the upper ends of the flue spaces 61, 62, which lead the same into the horizontal flues 78 and connected outlet 80, hereinabove described.

It should now be apparent, from the foregoing description, that a great economy in the consumption of the fuel gas used can be effected through rational employment of the diverse sections of the stove and the two sets of burners provided for the same. Thus, the heat generated by the burners on the left is available not only for the cooking top and the broiler compartment directly underneath, but can further be utilized in the upper baking and roasting oven. Likewise, when the top cooking surface is not in operation, the burners on the right can be used to broil and roast, or broil and bake. The two sets of burners can be used at the same time, the heat currents emitted by both sets being assembled in the baking or roasting oven. Several advantageous ways have been shown in which the heat from the burners, or either of them, can be applied to the oven, both interiorly and exteriorly. According to one of the methods disclosed, the heat is brought into the oven through the bottom thereof, directly beneath the articles to be cooked. A modification of this method affords a means for tempering the intensity of the heat at its entrance into the oven, and reflecting it in different directions. Pursuant to another method, the heat is admitted into the oven laterally. In accordance with still another method, no heat enters the oven directly, but the interior thereof is heated solely by radiation, this being particularly desirable whenever it is required that the products of combustion or the impurities in the gas shall not in any way come into contact with or be absorbed by moist articles that are being cooked in the oven.

I claim:

1. In a stove, a plurality of spaced-apart ovens, each provided with an opening; a duct extending from an opening in one oven and restricting the opening in the other oven; a source of heat; and a duct connecting one of said ovens with said source of heat through the restricted opening.

2. In a stove, a plurality of spaced-apart ovens, each provided with an opening therein; a duct extending from the opening in one oven and restricting the opening in the other oven; a source of heat; a duct connecting one of said ovens with said source of heat through the restricted opening; and an independent source of heat in communication with one of said ovens through one of said ducts.

3. In a stove, a plurality of spaced-apart ovens, each provided with an opening therein; a duct extending from an opening in one oven and restricting the opening in the other oven; flues extending around said ovens; and means for heating one of said ovens by radiation.

4. In a stove, a plurality of spaced-apart ovens, each provided with an opening therein; a duct extending from an opening in one oven and restricting the opening in the other oven; flues extending around said ovens; means for heating one of said ovens by radiation; and a plurality of baffles arranged in said flues, the area of said baffles being increased in proportion to the height at which the baffle is placed in said flues.

5. In a stove, a plurality of spaced-apart ovens, each provided with an opening therein; a duct extending from an opening in one oven and restricting the opening in the other oven; a horizontal flue disposed above one of said ovens; and a communicating passage between said oven and said horizontal flue.

6. In a stove, a plurality of sources of heat; a compartment; a duct leading heat currents from one source of heat into said compartment; a duct leading heat currents from another source of heat into said compartment and restricting the entry of heat currents from the first-mentioned source and mingling the heat currents from both sources at the point where they enter the compartment.

7. A stove comprising a top plate; a source of heat disposed thereunder; an oven disposed below said source of heat; a second oven laterally disposed with relation to said first mentioned oven; a third oven disposed above the laterally disposed oven, certain of these ovens being provided with an opening; flues disposed around said ovens; an independent source of heat disposed beneath the last-mentioned oven; a duct connected with an opening in the laterally-disposed oven, at its inner end, and at its outer end arranged in spaced relation to the edges of the opening in the upper oven, whereby a passage is effected for heat currents from the independent source of heat to enter the upper oven; and a duct connecting the first-mentioned source of heat with the upper oven through the restricted opening formed between the outer edges of the duct and the edges of the hole in the upper oven.

8. A stove comprising a top plate; a source of heat disposed thereunder; an oven disposed below said source of heat; a second oven laterally disposed with relation to said first-mentioned oven; a third oven disposed above the laterally disposed oven, certain of these ovens being provided with an opening; flues disposed around said ovens; a source of heat disposed beneath the last-mentioned oven; a duct connecting an opening in the laterally disposed oven at its inner end, and at its outer end arranged in spaced relation to the edges of an opening in the upper oven, whereby a passage is effected for heat currents from the independent source of heat to enter the upper oven; a duct connecting the first-mentioned source of heat with the upper oven through the restricted opening formed between the outer edges of the duct and the edges of the hole in the upper oven; a horizontally disposed flue above the upper oven; and a passage between said oven and said flue.

9. A stove comprising a top plate; a source of heat disposed thereunder; an oven disposed below said source of heat; a second oven laterally disposed with relation to said first mentioned oven; a third oven disposed above the laterally disposed oven, each of these ovens being provided with an opening; flues disposed around said ovens; a source of heat disposed beneath the last-mentioned oven; a flue connected in proximity to an opening in the laterally disposed oven, at its inner end, and at its outer end arranged in spaced relation to the edges of each opening in the upper oven, whereby a passage is effected for heat currents from the independent source of heat to pass into the upper oven; a duct connecting the first-mentioned source of heat with the upper oven through the restricted opening formed between the outer edges of the duct and the edges of the hole in the upper oven; and means for directing a portion of the heat currents into the flues around said ovens.

10. A stove comprising a top plate; a source of heat disposed thereunder; an oven disposed below said source of heat; a second oven laterally disposed with relation to said first-mentioned oven; a third oven disposed above the laterally disposed oven, each of these ovens being provided with an opening; flues disposed around said ovens; a source of heat disposed beneath the last-mentioned oven; a duct communicating with an opening in the laterally disposed oven, at its inner end, and at its outer end arranged in spaced relation to the edges of each opening in the upper oven, whereby a passage is effected for heat currents from the independent source of heat to enter the upper oven; a duct connecting the first-mentioned source of heat with the upper oven through the restricted opening formed between the outer edges of the duct and the edges of the hole in the upper oven; and baffles in said flues, the area of said baffles being enlarged in proportion to the height which the baffle occupies in the flue.

In testimony whereof, I have signed my name to this specification.

HENRY W. O'DOWD.